US006675295B1

(12) United States Patent
Marcelais et al.

(10) Patent No.: US 6,675,295 B1
(45) Date of Patent: Jan. 6, 2004

(54) METHOD AND COMPUTER SYSTEM FOR DETECTING AND CORRECTING A FAILURE IN A COMPUTER APPLICATION PROGRAM DURING STARTUP

(75) Inventors: Michael R. Marcelais, Redmond, WA (US); Brian T. Hill, Renton, WA (US); Eric LeVine, Seattle, WA (US); Steven Miles Greenberg, Hastings-on-Hudson, NY (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 09/596,591

(22) Filed: Jun. 19, 2000

(51) Int. Cl.$^7$ .................. G06F 15/177; G06F 9/24; G06F 9/445
(52) U.S. Cl. ............... 713/2; 713/1; 713/200; 714/1; 714/2; 714/38
(58) Field of Search .............. 713/2, 200, 1; 714/1, 2, 38

(56) References Cited

U.S. PATENT DOCUMENTS

| | | | |
|---|---|---|---|
| 4,654,821 A | * 3/1987 | Lapp | 713/330 |
| 5,124,989 A | * 6/1992 | Padawer et al. | 714/38 |
| 5,132,972 A | * 7/1992 | Hansen | 714/38 |
| 5,208,814 A | * 5/1993 | Ulrich et al. | 714/47 |
| 5,278,976 A | * 1/1994 | Wu | 714/55 |
| 5,475,839 A | * 12/1995 | Watson et al. | 713/2 |
| 5,712,972 A | * 1/1998 | Kakkar | 714/26 |
| 5,956,513 A | * 9/1999 | McLain, Jr. | 717/142 |
| 6,230,284 B1 | * 5/2001 | Lillevold | 714/13 |
| 6,381,694 B1 | * 4/2002 | Yen | 713/2 |

FOREIGN PATENT DOCUMENTS

EP 0794495 A2 * 10/1997

OTHER PUBLICATIONS

Rodriguez et al., "Identifying Mode Confusion Potential In Software Design," 2000 IEEE, 5.D.2–1 thru 5.D.2–8.*

* cited by examiner

*Primary Examiner*—Thomas Lee
*Assistant Examiner*—Michael Nieves
(74) *Attorney, Agent, or Firm*—Merchant & Gould

(57) ABSTRACT

Methods and systems for detecting and correcting computer software problems that cause an application program to crash upon startup are provided. Unsafe startup actions that are costly to initiate in terms of processor time and memory are handled by placing an unsafe startup action marker into the system registry prior to attempting startup. If an unsafe program module starts or boots successfully without causing the software application to crash, the unsafe startup action marker is deleted from the system registry. If loading the unsafe program module causes the application to crash, then startup actions, including corrective actions, are written into the unsafe startup action marker and are used on subsequent startup of the crashed application program to instruct the application on how to fix the problem. Other unsafe startup actions that are not costly in terms of processor time and memory are initially handled by an exception handler. If the application crashes as a result of such an unsafe startup action, then an unsafe startup action marker is written to the system registry as described above. Corrective startup actions are written to the marker for use by the application upon reboot.

22 Claims, 3 Drawing Sheets

METHOD AND COMPUTER SYSTEM FOR DETECTING AND CORRECTING A FAILURE IN A COMPUTER APPLICATION PROGRAM DURING STARTUP

FIELD OF THE INVENTION

The invention relates generally to computer application program modules, and more particularly, the invention relates to methods and systems for detecting and correcting cyclic crash problems occurring during startup of computer application programs and documents.

BACKGROUND OF THE INVENTION

Despite the best efforts of software developers, software programs inevitably fail at one time or another. One type of failure is a crash. A crash occurs while a program module is running and results in the suspension of operation of the program module. Crashes are frustrating to users and, in some cases, may cause the user to lose work.

Often users attempt to open a complicated software application only to find that the application crashes during startup. Upon such an occurrence, the user typically tries to reboot the application. If the application crashes each time the user attempts to reboot, the application may have experienced a problem that will cause the application to crash each and every time the user attempts to start the application. Such a problem that causes the application to crash each time during startup is known as a cyclic crash problem.

Prior systems have been used to detect a crash causing problem followed by attempting a subsequent startup or "reboot" in a "safe mode." Typically, entering the "safe mode" results in the application disabling all custom program modules (e.g., third party program modules added to the application program). Such a "safe mode" also typically results in the application resetting all customized settings to default settings. Additionally, such systems typically operate only to detect application startup problems and do not detect or handle problems caused by opening a document or other file after startup of the application with which the document or file is edited.

Accordingly, there is a need in the art for a method and system for detecting crashes and failures during startup, recognizing what problem occurred when the crash or failure occurred, and suggesting a correction action to the user so that the application may be re-started successfully.

There is further a need in the art for a method and system for detecting and correcting a crashes caused by opening a document or file after startup.

SUMMARY OF THE INVENTION

The present invention addresses the foregoing problems by providing a method and system for detecting and correcting computer software problems that cause an application program to crash upon startup. Unsafe startup actions that are costly to initiate in terms of processor time and memory are handled by placing an unsafe startup action marker into the system registry prior to attempting startup. If an unsafe program module starts or boots successfully without causing the software application to crash, the unsafe startup action marker is deleted from the system registry.

If loading the unsafe program module causes the application to crash, then startup actions, including corrective actions, are written into the unsafe startup action marker and are used on subsequent startup of the crashed application program to instruct application on how to fix the problem. Other unsafe startup actions that are not costly in terms of processor time and memory are initially handled by an exception handler. If the application crashes as a result of such an unsafe startup action, then an unsafe startup action marker is written to the system registry as described above. Corrective startup actions are written to the marker for use by the application upon reboot.

More particularly stated, the present invention provides a method and system for detecting and correcting a failure in a computer application program during startup. The method comprising the steps of attempting a startup of the computer application program; preparing a startup marker for identifying the attempted startup; and identifying an unsafe action for performing as part of the step of attempting startup. An unsafe action marker is prepared for identifying the unsafe action. After the unsafe action is attempted, if the unsafe action is performed without causing a startup failure, the unsafe action marker is deleted. And, if the computer application program is started without failure the startup marker is also deleted. If the unsafe action is not performed without causing a startup failure, startup actions for correcting a failure associated with the unsafe action upon the next attempted startup of the computer application program are written into the unsafe action marker. Preferably the startup actions are performed upon attempting a second startup of the computer application program.

Writing startup actions for correcting a failure associated with the unsafe action upon the next attempted startup of the computer application program into the unsafe action marker may include writing an instruction to disable performance of the unsafe action upon the next attempted startup of the computer application program. Alternatively, writing startup actions into the unsafe action marker may include writing an instruction to disable customizing operating settings for the functionality of the computer application program and setting operating settings to default settings.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
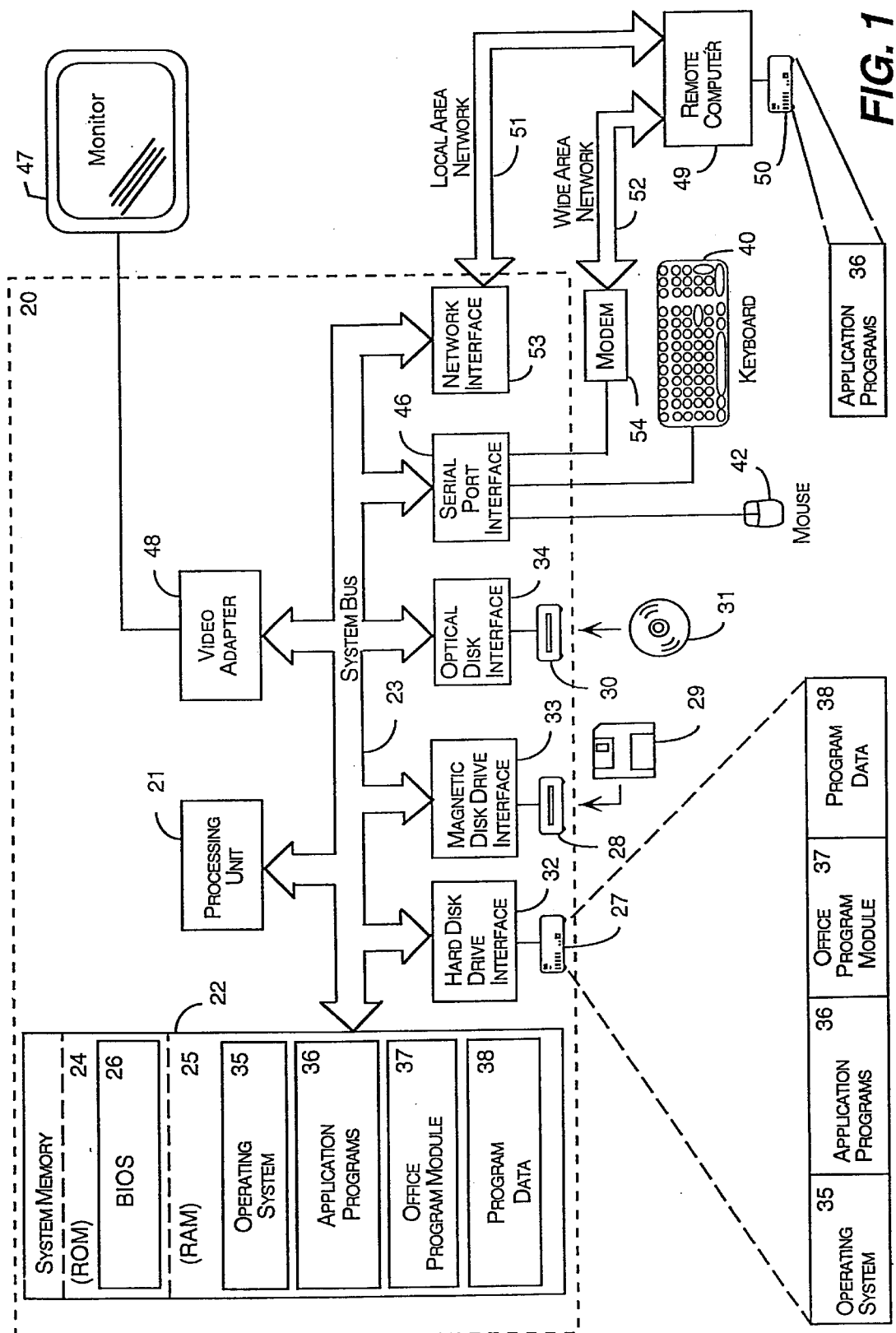
FIG. 1 is a block diagram of a computer that provides the exemplary operating environment for the present invention.

In accordance with an exemplary embodiment of the present invention, a startup marker is written into the system registry at the beginning of startup of a given software application program. Unsafe startup actions that have been identified as potentially causing the application program to crash on startup are identified by software developers. Unsafe startup actions that are costly to initiate in terms of processor time and memory are handled by placing an unsafe startup action marker into the system registry prior to attempting startup. Such unsafe startup actions include, for example, loading into a given software application a program module developed by a third party from the developer of the software application.

If the application hangs, and the user is forced to reset the user's computer, the startup action marker will remain in the system registry and the application can attempt to correct the problem upon the subsequent startup of the application. As is understood by those skilled in the art, a hang may be many conditions during or after startup that prevents the user from using the software application. For example, a hang may occur during use of the software application where the application gets caught in an "infinite loop" and is unable to proceed to process according to its programming. In such cases the user may be forced to reset or "reboot" the application.

If the unsafe program module starts or boots successfully without causing the software application to fail, the unsafe startup action marker is deleted from the system registry. The next unsafe action is then commenced, and so on, until all components of the software application, both safe and unsafe, have booted. If on the other hand, loading the unsafe program module causes the application to crash, then startup actions, including corrective actions, are written into the unsafe startup action marker. Then, on subsequent startup of the crashed application program, the startup actions written to that marker instruct the application on how to fix the problem. In one exemplary embodiment, the instruction provided to the application, includes disabling the unsafe program module and placing it on a disabled items list so that it will not cause the application program to crash upon reboot.

In contrast, other unsafe startup actions that are not costly in terms of processor time and memory are initially handled by an exception handler. An example of such a problem is customizing feature settings, such as customizing toolbar settings to settings desired by the user. Use of an exception handler is advantageous in such cases because writing a marker to the system registry is too costly in terms of processor time and memory compared to the relatively low cost of customizing feature settings. If the application does crash as a result of such an unsafe startup action, for example customizing tool bar settings, then an unsafe startup action marker is written to the system registry as described above. Corrective startup actions are written to the marker for use by the application upon reboot. For example, upon reboot of the crashed application program, it may be instructed via the startup actions to reset all customized settings to default settings.

It should be understood that the use of an exception handler for such startup actions is a choice dictated by desired application performance. That is, use of the exception handler for actions requiring lower levels of computer system performance, such as memory and processing time, will save memory and processing time otherwise required for initially writing a marker into the system registry. On the other hand, use of the registry marker may be advantageous where writing the marker to the registry uses relatively low performance requirements as compared to high performance requirements necessary for loading a given software application program module.

In an exemplary embodiment, the invention is discussed in terms of a word processing program module. An example of such a word processing program is "WORD" marketed by Microsoft Corporation of Redmond, Wash. While the invention may be described in the general context of a word processing program module running in conjunction with a personal computer, those skilled in the art will recognize that the invention also may be implemented in combination with other program modules. Those skilled in the art recognize that program modules may refer to a collection of routines and data structures that performs a particular task or implement a particular abstract data type. Modules usually comprise two parts: an interface, which lists the constants, data types, variables, and routines that can be accessed by other modules or routines, and an implementation, which is private (accessible only to the module) and which contains the source code that actually implements the routines in the module.

Turning now to the figures, in which like numerals refer to like elements throughout the several figures, aspects of the present invention will be described.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Overview of Application Program Startup

Figure 2:
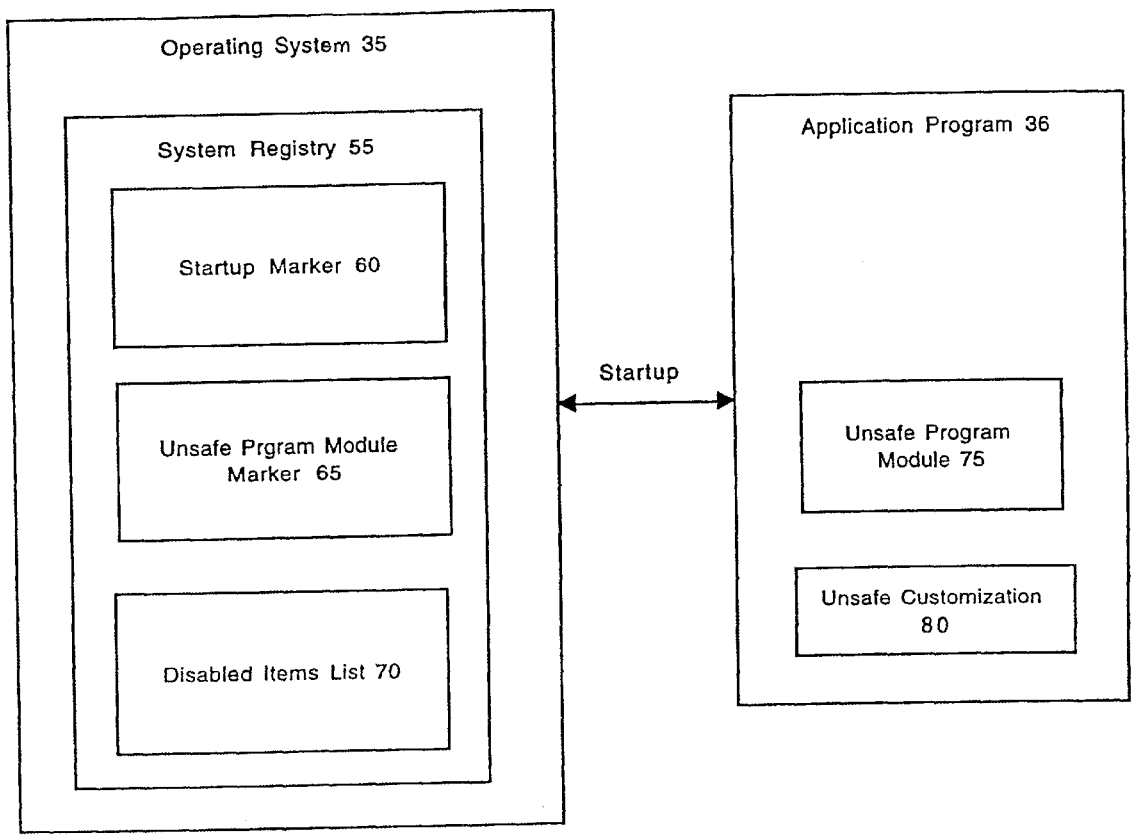
FIG. 2 is a simplified block diagram showing interaction between a computer operating system and an application program during startup of the application program.

FIG. 2 is a simplified block diagram showing interaction between a computer operating system 35 and an application program 36 during startup of the application program. As discussed in detail below, when the user attempts to open an application program 36, for example a word processing program, a startup marker 60 or "boot marker" is written into the system registry 55 of the operating system 35.

During startup, when the operating system 35 begins to load an unsafe program module 75, such as a potentially incompatible third party program module added to the application program 36 (hereafter, "third party add-in"), another marker 65 is written to the system registry 55. If the application program 36 starts up successfully, the unsafe program module marker 65 and the startup marker 60 are deleted from the system registry. If not, those markers will assist the application in correcting the problem during a subsequent startup. As described in detail below, one corrective action potentially taken by the application 35 is to disable the unsafe program module 75 upon subsequent startup. If the application 35 disables the unsafe program module 75, that module is placed on the disabled items list 70 contained in the operating system registry 55.

Operation of an Exemplary Implementation

Figure 3:
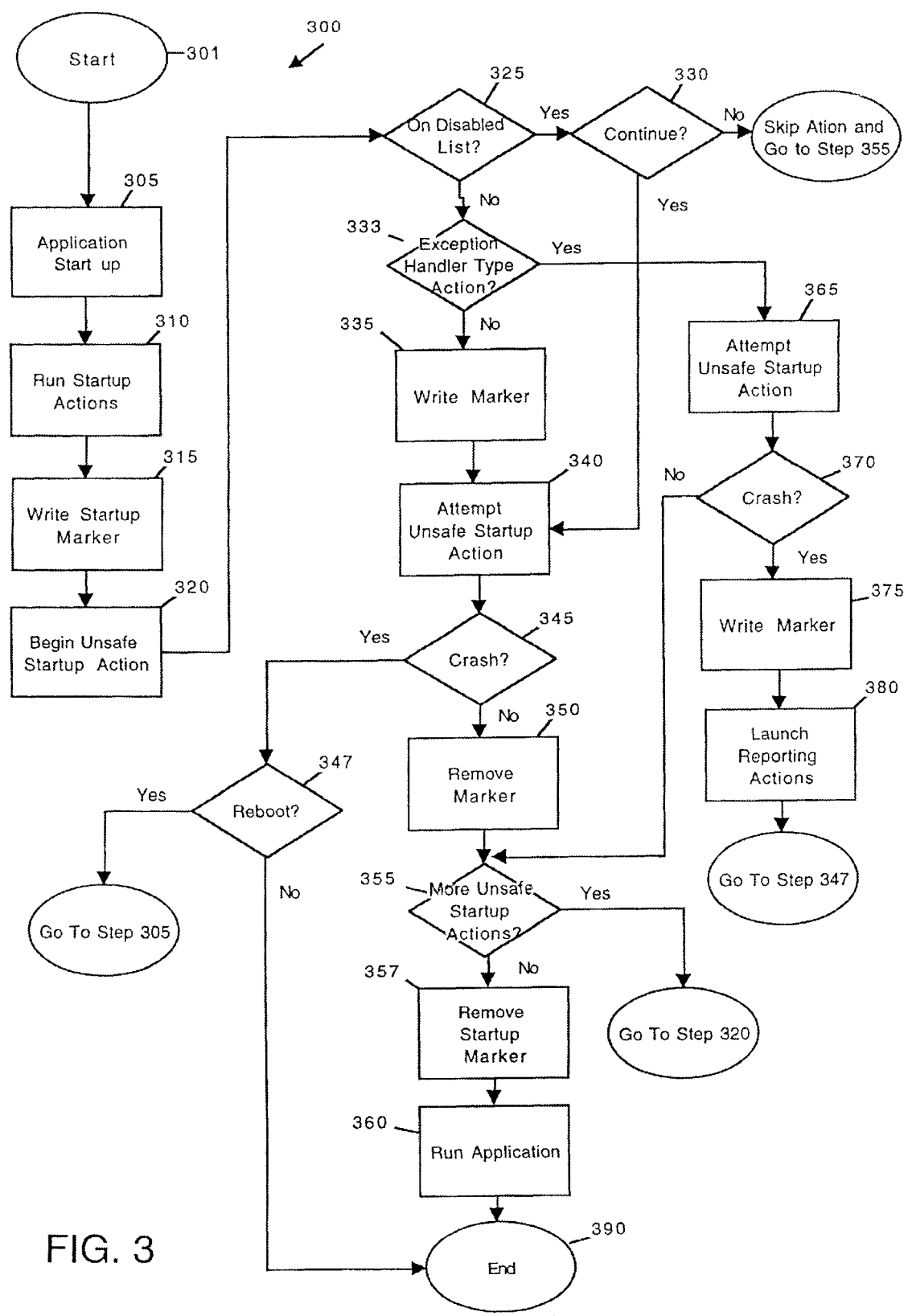
FIG. 3 is a flowchart illustrating an exemplary method for detecting and repairing a cyclic crash problem occurring during startup of a computer software application program.

Having described an exemplary operating environment for the present invention, an exemplary method 300 will be described in reference to FIG. 3. FIG. 3 is a flow chart illustrating an exemplary method 300 for detecting and repairing a cyclic crash problem occurring during startup of a computer software application. The method 300 is described with reference to components and elements illustrated and described with reference to FIGS. 1 and 2.

The method 300 begins at step 301 and proceeds to step 305 where the user begins startup or "boot" of a computer application program 36. For purposes of example only, FIG. 3 will be described at times in terms of opening a word processing computer application. At step 305, the user initiates startup of the computer application 36. As is well known to those skilled in the art, the application startup may be initiated in a number of ways including directly selecting the application for startup or opening a document created by or to be edited by that application.

After application startup begins at step 305, the method proceeds to step 310, and the application (36) checks the system registry 55 for any startup actions necessary for its successful startup. As will be discussed in detail below, startup actions include actions contained in any markers 65 left in the system registry 55 from a previous unsuccessful startup of the application 36.

At step 315, the application (36) of the user's computer 20 writes a startup marker 60 into the operating system registry 55 to indicate that the application startup has initiated. If at step 310, no startup actions are required for the startup of the application 36, then after the startup marker 60 is written into the operating system registry 55, the method proceeds to step 320 where a first "unsafe" action is initiated.

As previously described, in this case, an unsafe action may include any action necessary for startup that has the potential to or that has been known to cause the application to crash. For example, the unsafe action may be the startup of an unsafe program module 75, such as a potentially incompatible third party add-in to the application 36. For example, the user may have purchased or downloaded a third party add-in to the user's word processing application that provides some functionality not included in the original word processing application coding, such as an add-in to provide a desktop publishing feature that was not provided as a part of the original coding for the word processing application. If the coding of the third party add-in is incompatible with the coding of the user's application 36, the startup of the third party add-in may cause the user's application 36 to crash during startup. On the other hand, as described below, an unsafe action may also include startup of the application 36 with customized settings, such as customized tool bar settings, that may cause the application to crash. Likewise, merely opening a document with corrupt data or formatting may cause the application 36 to crash, and therefore, would be characterized as an unsafe action.

In accordance with the present invention, at step 325, a determination is made whether the unsafe program module 75 has been previously disabled to prevent the module from causing a crash of the software application 36. If at step 325, the unsafe program module 75 has been disabled, and is present on a disabled items list 70 contained in the operating system registry 55 of the user's computer, the method proceeds to step 330. At step 330, a determination is made whether to continue the action of starting up the unsafe program module 75 as a part of the startup of the software application 36.

In an exemplary embodiment, the user may be provided a prompt via a user interface where the user is notified that the action, in this case an unsafe program module 75, has been disabled. The user is then asked whether the user would like to leave the action disabled or whether the user would like to attempt to startup the action. If the user does not wish to initiate the disabled action, the method proceeds to step 355 and no attempt at startup of the previously disabled software module is made. At step 355, as will be discussed in detail below, a determination is made whether startup of additional unsafe actions is required.

If, at step 330, the decision is made by the user to continue with startup of the previously disabled software module, the method proceeds to step 340 where startup of the previously disabled software module is initiated. At step 345 a determination is made whether initiation of the previously disabled software module causes a crash of the software application 36. If the software application 36 crashes at step 345, the method proceeds to step 347 where a determination is made whether to reboot the application. If at step 345, the application 36 does not crash as a result of the startup of the previously disabled software module, the method proceeds to step 350 where any markers placed in the operating system registry 55 related to a previous failure to successfully startup the previously disabled software module are removed from the operating system registry 55.

At step 355, a determination is made whether additional unsafe actions should be initiated. If additional unsafe actions must be initiated, the method proceeds to step 320 where the process is repeated. If no additional unsafe actions are required, the method proceeds to step 360 where the application 36 begins normal operation. Referring back to step 325, if the desired software module which has previously been identified as an unsafe action is not on the disabled items list 70 contained in the operating system registry 55, the method proceeds to step 333.

At step 333, a determination is made whether the unsafe action has been identified to be handled by the writing of a marker to the operating system registry 55 of the user's computer 20 or whether the potentially unsafe action has been identified to be handled by a local exception handler. As is understood to those skilled in the art, writing a marker to the operating system registry 55 is a relatively costly action in terms of time required to write the marker to the registry 55 and in terms of memory and processing power used by that action. Accordingly, in accordance with an exemplary embodiment of the present invention, markers are written to the system registry 55 for those actions that already require a significant investment of processor time and memory. For example, the startup of an unsafe program module 75 added to the user's word processing software application 36 requires a significant investment in terms of processor time and memory. The additional processor time and memory associated with writing a marker to the operating system registry 55 prior to initiating startup of that unsafe program module 75 is negligible.

On the other hand, for quicker startup actions, for example, setting user specified customizations to a functionality of the software application, such as toolbar customizations, tying up processor time and memory by placing a marker in the operating system registry 55 prior to attempting those actions is costly and inefficient. Therefore, in accordance with an exemplary embodiment of the present invention, quicker actions, such as user specified toolbar customizations, are handled by a local exception handler in the event that the initiation of those actions causes a crash of the software application 36. It should be understood, that the developers of the software application 36 may decide prior to distribution of the software application 36 which actions are considered to be unsafe actions as described herein and whether those actions should be initiated by the software application 36.

If at step 333 a determination is made that the unsafe action being initiated is of the type identified for handling via the marker method described above, the method proceeds to step 335 and a marker is written to the operating system registry 55 of the user's computer. The marker written to the system registry 55 includes information which is necessary to handle a crash caused by the software program module, in this case the unsafe program module 75, during a subsequent startup of the application. That is, the marker includes information to identify the software module, such as the unsafe program module 75 according to the present example. The marker also includes a process identification to identify the unsafe program module 75 in relation to the present instance of the software application 36 to which the software module is being added.

The process identification is necessary to prevent the subsequent processing of a crash caused by this particular program module from affecting a separately running instance of the user's software application 36. For example, if the user is running two instances of the same word processing program at the same time on the user's computer 20 and the startup of a particular software program module causes a crash of the startup of one instance of the software application 36, the inclusion of the process identification information in the marker prevents the application (36) from attempting to correct the problem in both of its instances. That is, if the subsequent startup action includes disabling the unsafe program module 75, for example, a third party add-in, inclusion of the process identification in the marker will prevent the application (36) from disabling the unsafe program module 75 in both instances of the software application 36.

After the marker is written to the operating system registry 55 at step 335, the method proceeds to step 340, and the application (36) attempts to initiate or start up the unsafe action. At step 345, a determination is made whether the software application 36 crashes after the attempted startup of the unsafe software program module. If the software application 36 does not crash at step 345, the method proceeds to step 350, and the marker for the unsafe program module is removed from the operating system registry 55. Removal of the marker from the operating system registry 55 provides information to the operating system 35 on subsequent startups of the software application 36 that the startup of the unsafe program module 75 was successful in the immediately proceeding startup of the software application.

At step 355, a determination is made whether additional unsafe actions need to be taken. That is, a determination is made whether additional unsafe program modules or unsafe customizations should be initiated as a part of the startup of the software application 36. If at step 355 additional unsafe actions must be taken, for example loading additional unsafe program modules 75, the method proceeds back to step 320 and the process is repeated. If at step 355, a determination is made that no additional unsafe startup actions must be taken to successfully complete startup of the software application 36, the method proceeds to step 357, and the startup marker 60 is removed from the operating system registry 55. Removal of the startup marker 60 from the operating system registry 55 provides information to the operating system 35 on subsequent startups of the software application 36 that the immediately proceeding startup of the software application 36 was successful.

The method then proceeds to step 360 where the software application 36 is run according to normal operation. In accordance with the present example, the user's word processing software application 36 may then be used to prepare and process documents according to its programming. At step 390, the method ends.

Referring back to step 345, if the startup of the software application 36 crashes as a result of the startup of the unsafe program module, the method proceeds to step 347. At step 347, the user of the software application 36 determines whether to reboot the application after the crash. If the user decides to reboot the application, the method proceeds back to step 305, and the user re-initiates startup of the software application 36. If at step 347, the user decides not to attempt to reboot the software application 36, the method ends at step 390.

Referring back to step 333, of FIG. 3, if a determination is made that the unsafe startup action has been identified as a startup action to be handled by a local exception handler in the event of a failure or crash during startup, the method proceeds to step 365. As described above, an exemplary unsafe startup action that may be identified for handling by a local exception handler may include the setting user specified customizations, such as setting user specified toolbar customizations.

At step 365, the operating system 35 attempts to initiate the unsafe startup action that has been identified to be handled by a local exception handler in the event of a failure. In contrast to the attempted startup of the unsafe software module 75, described above under the marker method, no marker is written to the operating system registry 55 prior to step 365 for the unsafe startup action identified to be handled by a local exception handler. In the case of unsafe startup actions that have been identified to be handled by a local exception handler in the event of a failure, a marker is only written to the operating system registry 55 after a crash. After startup of the local exception handler type unsafe startup action is attempted, the method then proceeds to step 370, and a determination is made whether the software application 36 crashes as a result of initiating the unsafe startup action. If at step 370, the software application 36 does not crash, the method proceeds to step 355, and the method proceeds as described in detail above.

If at step 370 the software application 36 crashes as a result of initiating the local exception handler type unsafe startup action, the method proceeds to step 375, and a marker is written to the operating system registry 55 in the same manner as described for step 335 above. That is, a marker is written to the operating system registry 55 that includes the process identification for the unsafe startup action and includes actions that may be run upon the subsequent startup to prevent the same crash from occurring. For example, if the unsafe startup action initiated at step 365 includes setting toolbar customizations to settings specified by the user, the marker may include startup actions that will set or recommend that the user set the toolbar customizations to default settings in accordance with the original settings provided with the software application 36.

After the marker 65 is written to the operating system registry 55 at step 375, the method proceeds to step 380. At step 380, in accordance with a preferred embodiment of the present invention, the failure to startup the software application 36 with the unsafe startup actions may be reported to a separate database or location for purposes of analysis and correction of the problem. For example, the occurrence of the crash may be reported to a repository of information such as a remote server or a local corporate file server operated by the developer of the software application 36. It should be understood that reporting the occurrence of the crash may also be performed after step 345, described above, for the marker method. For a more detailed description of reporting a failure as described, see "Method and System for Reporting a Program Failure", U.S. patent application Ser. No. 09/571,629, filed May 15, 2000, commonly assigned and incorporated by reference herein.

After reporting the occurrence of the crash during startup of the software application 36, the method proceeds to step 347 where a determination is made whether the user wants to reboot the software application 36, as described in detail above. If the user decides to attempt to reboot or re-initiate startup of the software application 36 after a crash of the software application 36 after either steps 340 or 365, described above, the method proceeds to step 305, and the user attempts to start up the software application 36, as previously described. At step 310, a startup marker 60 is written to the operating system registry 55.

The method then proceeds to step 310, and the operating system 35 searches the operating system registry 55 for markers remaining from the previously attempted startup of the software application 36. If the application (36) locates a marker 65 which was written for an unsafe program module 75, for example a third party add-in as described above, the application (36) reads the marker 65 to obtain information about the previous failure to load or start up the unsafe program module. In accordance with an exemplary embodiment of the present invention, the marker 65 contains process identification for the unsafe program module and an instruction to the application (36) to disable the unsafe program module. Preferably, the marker 65 will also include information about previous attempts to load the unsafe program module including how many times startup was attempted and whether any other corrective measures were taken, as described below.

If at step 310, the startup actions contained in the marker 65 include an instruction to disable the unsafe program module, the user preferably is provided a prompt via a user interface which requests the user's permission to disable the unsafe program module 75 and to place the unsafe program module on a list of disabled items 70. It should be understood, however, that the application (36) can disable an unsafe program module automatically and then provide the user information as to items that have been placed on the disabled items list. It should also be understood that the disabled items list 70 is not restricted to unsafe program modules. Other items, for example corrupt documents, may also be disabled and placed on the disabled items list 70. For example, if startup of a word processing software application crashes each time a user attempts to open a certain word processing document, the method and system of the present invention will detect that the crash is caused by the opening of that certain document, and may provide instructions to the user, via the subsequent startup actions, to place the document on the disabled items list 70. In an exemplary embodiment, a user interface is provided for allowing the user to re-enable the disabled program module 75 at such a time as the problem with that module has been corrected or when desired by the user.

If the user decides to disable an unsafe startup action, such as an unsafe program module 75, during startup, then startup of the unsafe startup action will be avoided and likewise a crash of the startup of the software application 36 associated with that unsafe program module also will be avoided As described above, markers 65 that are placed on the operating system registry 55 provide information and instructions to the application (36) as to repairs associated with the specific unsafe program module or unsafe action associated with that marker 65. If the information provided in the marker 65 shows that corrective startup actions have previously been taken to correct a failure or crash associated with the unsafe program module or unsafe startup action associated with that marker 65, the application (36), according to an exemplary embodiment of the present invention, may attempt more extensive corrective measures. For example, the application (36) may next attempt to start up in a "safe mode" whereby the application (36) does not load any third party program modules or add-ins, does not load any non-essential optional features, and sets all customizations to default settings. If the software application program crashes after it takes this measure of corrective action, the application (36) may then take yet additional action including reinstallation of certain components of the affected software application program.

Other alternative embodiments will become apparent to those skilled in the art to which an exemplary embodiment pertains without departing from its spirit and scope. Accordingly, the scope of the present invention is defined by the appended claims.

The invention claimed is:

1. A method for detecting and correcting a failure in a computer application program during startup, the method comprising the steps of:
   attempting a startup of the computer application program;
   preparing a startup marker for identifying the attempted startup;
   identifying an unsafe action for performing as part of the step of attempting startup;
   preparing an unsafe action marker for identifying the unsafe action;
   attempting the unsafe action;
   if the unsafe action is performed without causing a startup failure, deleting the unsafe action marker;
   if the computer application program is started without failure, deleting the startup marker; and
   if the unsafe action is performed without causing a startup failure, writing into the unsafe action marker startup actions for correcting a failure associated with the unsafe action upon the next attempted startup of the computer application program.

2. The method of claim 1, further comprising the steps of:
   attempting a second startup of the computer application program; and
   performing the startup actions for correcting the failure.

3. The method of claim 1, wherein the step of writing into the unsafe action marker startup actions for correcting a failure associated with the unsafe action upon the next attempted startup of the computer application program, includes the step of:
   writing an instruction to disable performance of the unsafe action upon the next attempted startup of the computer application program.

4. The method of claim 3, wherein the step of attempting the unsafe action, includes the step of:
   loading a program module into the computer application program.

5. The method of claim 4, wherein the step of performing the startup actions for correcting the failure, includes the step of:
   disabling loading the program module into the computer application program.

6. The method of claim 5, wherein the program module is a third party add-in function adding to the functionality of the computer application program.

7. The method of claim 3, wherein the step of attempting the unsafe action, includes
   customizing operating settings for the functionality of the computer application program.

8. The method of claim 7, wherein the step of performing the startup actions for correcting the failure, includes the step of:
   disabling customizing operating settings for the functionality of the computer application program.

9. The method of claim 8, wherein the step of disabling customizing operating settings for the functionality of the computer application program, includes the step of:
   setting operating settings for the functionality of the computer application program to default settings.

10. A computer-readable medium having computer-executable instructions, which when executed by a computer, perform the method of claim 1.

11. A computer system operative to perform the method of claim 1.

12. A method for detecting and correcting a failure in a computer application program during startup, the method comprising the steps of:
   attempting startup of the computer application program;
   identifying an unsafe action for performing as part of the step of attempting startup;
   preparing an unsafe action marker for identifying the unsafe action;
   determining there is a failure in the application program, said failure preventing startup of the application program;
   preparing startup actions for correcting the failure on the next attempted startup of the application program;
   attempting a second startup of the computer application program; and
   performing the startup actions for correcting the failure.

13. The method of claim 12, prior to the step of determining there is a failure in the application program, including the step of:
   preparing a startup marker for identifying the attempted startup.

14. The method of claim 13, wherein the step of performing the startup actions for correcting the failure includes the step of:
   disabling the unsafe action prior to attempting a second startup of the computer application program.

15. The method of claim 12, prior to the step of attempting startup of the computer application program, including the steps of:
   identifying an unsafe action for performing as part of the step of attempting startup; and
   assigning an exception handler for processing a failure associated with performing the unsafe action.

16. A computer-readable medium having computer-executable instructions, which when executed by a computer, perform the method of claim 12.

17. A computer system operative to perform the method of claim 12.

18. A method for detecting and correcting a failure in a computer application program during startup, the method comprising the steps of:
   attempting a startup of the computer application program;
   preparing a startup marker for identifying the attempted startup;
   identifying an unsafe action for performing as part of the step of attempting startup;
   performing the unsafe action;
   if the unsafe action is performed causing a startup failure, preparing an unsafe action marker for identifying the unsafe action; and writing into the unsafe action marker startup actions for correcting a failure associated with the unsafe action upon the next attempted startup of the computer application program.

19. The method of claim 18, wherein the step of identifying an unsafe action for performing as part of the step of attempting startup, includes the step of:

identifying an exception handler for managing performance of the unsafe action.

20. A computer-readable medium having computer-executable instructions, which when executed by a computer, perform the method of claim 18.

21. A computer system operative to perform the method of claim 18.

22. A method for detecting and correcting a failure in a computer application program during startup, the method comprising the steps of:

identifying an unsafe action for performing as part of the step of attempting startup; and assigning an exception handler for processing a failure associated with performing the unsafe action;

attempting startup of the computer application program;

determining there is a failure in the application program, said failure preventing startup of the application program;

preparing startup actions for correcting the failure on the next attempted startup of the application program;

attempting a second startup of the computer application program; and performing the startup actions for correcting the failure.

\* \* \* \* \*

UNITED STATES PATENT AND TRADEMARK OFFICE
CERTIFICATE OF CORRECTION

PATENT NO.   : 6,675,295 B1
DATED        : January 6, 2004
INVENTOR(S)  : Marcelais et al It is certified that error appears in the above-identified patent and that said Letters Patent is hereby corrected as shown below:

Column 10,
Line 59, "avoided As' should read -- avoided.  As --

Column 11,
Line 19, "the method of" should read -- the method --
Line 34, "is performed without causing" should read -- is performed causing --
Line 64, "action, includes" should read -- action, includes: --

Signed and Sealed this

First Day of June, 2004

JON W. DUDAS
*Acting Director of the United States Patent and Trademark Office*